Dec. 31, 1929.  C. MEYER  1,742,089
JUICE EXTRACTOR
Filed March 13, 1928
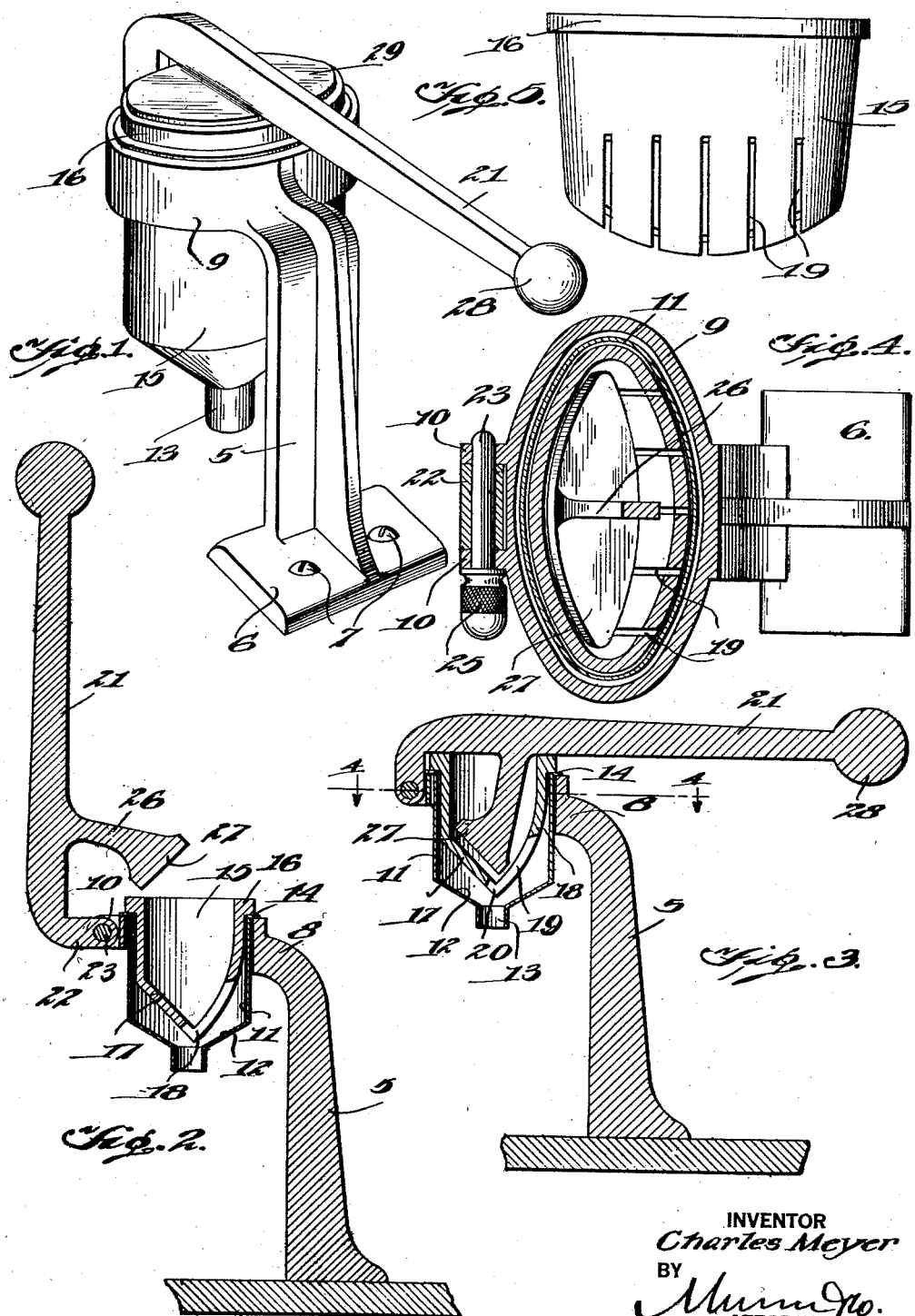
INVENTOR
Charles Meyer
BY
ATTORNEY Patented Dec. 31, 1929

1,742,089

UNITED STATES PATENT OFFICE

CHARLES MEYER, OF MIAMI, FLORIDA

JUICE EXTRACTOR

Application filed March 13, 1928. Serial No. 261,326. REISSUED

My invention relates to juice extractors and more particularly to devices for extracting juice from citrus fruits.

An object of the invention is to provide a hand operated juice extractor whereby a maximum amount of juice will be obtained from the fruit or other objects with but a minimum effort.

Further the invention provides a hand press or juice extractor which is particularly adapted for extracting the juice from citrus fruit halves and which is so constructed as to flatten out the fruit half to effectively press the juice therefrom.

The invention also contemplates a hand press embodying a funnel or receptacle whereby the extracted juice may be directed into a container.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a perspective of a juice extractor constructed in accordance with my invention;

Figure 2 is a vertical sectional view of the same illustrating the plunger in elevated position;

Figure 3 is a similar view showing the plunger in operated position;

Figure 4 is a horizontal section taken on line 4—4 of Figure 2; and

Figure 5 is an elevation of the removable receptacle embodied in the invention.

Referring to the invention in detail an upstanding arm or bracket, formed with an attaching plate 6 at its lower end adapted to be secured to a horizontal support by removable fastenings 7, is provided. At its upper end the arm is forwardly curved, as at 8, and is cast with a horizontally disposed elliptical-shaped rim or frame 9 having a pair of laterally extending parallel ears 10 at one side, the ears being equi-distantly spaced from a point diametrically opposite the forwardly curved end.

To discharge the extracted juice into a suitable receptacle, an elliptical in cross section shaped funnel 11 is removably received in the rim or frame, and is formed with a tapered bottom 12 having a central depending discharge spout 13. At its upper end the funnel is formed with a lateral flange 14 which rests upon the upper edge of the rim or frame to removably support the funnel.

For the purpose of holding fruit or other objects to be pressed, an elliptical in cross section shaped receptacle 15 is received within the funnel 11 and terminates at its upper edge in a lateral flange 16 which rests upon the flange 14. This receptacle is open at the top and is provided with an inclined bottom wall 17 and a longitudinally curved rear wall 18. To permit the extracted juice to gravitate from the receptacle and into the funnel, the rear wall of the receptacle is formed with a plurality of vertically extending spaced parallel slots 19 communicating at their lower ends with similarly spaced slots 20 provided in the lower edge of the inclined bottom wall.

Cooperating with the receptacle in pressing or extracting juice from objects placed therein, is a hand lever 21, normally lying across the upper end of the receptacle and provided with a right angularly disposed extension 22 received between the ears 10 and pivotally supported between the same by means of a removable pivot pin 23, the latter passing through the ears and extension, as illustrated in Figure 4, and terminating in a knurled head 25 at one end. An arm or web 26 extends from the under face of the hand lever adjacent its pivoted point and is movable into and out of the receptacle. An elliptical shaped plunger or head 27, of an area slightly less than the cross sectional area of the receptacle, is cast with the lower end of the arm or web and is adapted to be pressed against a fruit half contained in the receptacle by exerting downward pressure on the hand lever. For this purpose the hand lever is formed with a spherical grasping element 28 at its free end. It will be observed that the plunger or head, when in pressing position, is directly opposed to the bottom wall 17 in parallel relation thereto. Thus, due to the fact that the entire working surface of the plunger or head is parallel to this bottom wall, the entire surface of the fruit half will be subjected to the pressure of the bottom wall and plunger.

To maintain the interior parts in a sanitary condition, an elliptical shaped closure plate 29 is attached to the under face of the lever 21 adjacent its pivoted end and overlies the open end of the receptacle to close the latter, as illustrated in Figure 1.

In use, a fruit half is placed in the receptacle with its flat face opposed to the rear wall. The hand lever is now pressed downwardly to press the fruit between the plunger and bottom wall, which causes the fruit juice to flow into the funnel from whence it is discharged into a suitable receptacle placed there beneath. It will be observed that the several elements embodied in the invention may be readily disassembled for cleansing purposes and thus the entire device may be maintained in a clean and sanitary condition at all times.

Due to the fact that a pressed citrus half assumes an elliptical configuration in plan and that the plunger 27 follows the curvature of the curved wall 18, the fruit half will be forced forwardly so that its forward edges are held against the curved wall 18. With the fruit pressed in this manner substantially all of its pulp will be trapped within the fruit skin. It will therefore be seen that substantially none of the solid particles will pass from the device. It will also be observed that as the fruit half is pressed it sweeps the slotted rear wall of the receptacle to maintain the slots therein clear at all times. It will therefore be apparent that any pulp that may escape from the fruit skin will not be sheared off by the plunger to clog the slots.

What is claimed is:—

1. In a press an elliptical in plan receptacle, one side wall of which having a downwardly and inwardly curved portion which extends a considerable distance below the opposed side wall, a flat bottom wall connecting the lower edge of said opposed wall and lower edge of the curved wall portion and located at an oblique angle with respect to the horizontal, and a plunger in the receptacle and cooperating with the flat bottom and curved wall portion in exerting both radial and thrust pressure on the contents of the receptacle.

2. In a press a vertical post, a laterally extending supporting member attached thereto, an elliptical in plan receptacle carried by the supporting member, one side wall of the receptacle having a downwardly and inwardly curved portion which extends a considerable distance below the opposed side wall of the receptacle, a flat bottom wall connecting the lower edge of said opposed wall and the lower edge of the curved wall portion and located at an oblique angle with respect to the horizontal, a lever pivoted to the supporting member, a plunger carried by the lever and movable in the receptacle, and a cover plate attached to the lever directly above the plunger and normally resting upon the upper edge of the support to close the receptacle.

3. In a press an elliptical in plan receptacle, one side wall of which having a downwardly and inwardly curved portion which extends a considerable distance below the side wall, a flat bottom wall connecting the lower edge of said opposed wall and lower edge of the curved wall portion and located at an oblique angle with respect to the horizontal, the curved wall portion having vertically extending parallel slots and the forward edge of the inclined bottom being also provided with parallel slots which communicate with the lower ends of the vertically extending slots, and a plunger in the receptacle and cooperating with the flat bottom and curved wall portion in exerting both radial and thrust pressure on the contents of the receptacle.

Signed at Miami, in the county of Dade, and State of Florida, this 8 day of March, A. D. 1928.

CHARLES MEYER.